United States Patent
Armstrong et al.

(10) Patent No.: US 6,823,337 B2
(45) Date of Patent: Nov. 23, 2004

(54) ONE WRITER, MULTIPLE READERS, SHARED DATA TABLE CONCURRENT ACCESS

(75) Inventors: Troy David Armstrong, Rochester, MN (US); Kyle Alan Lucke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 319 days.

(21) Appl. No.: 09/749,105

(22) Filed: Dec. 27, 2000

(65) Prior Publication Data

US 2002/0083056 A1 Jun. 27, 2002

(51) Int. Cl.$^7$ ............................ G06F 17/30; G06F 7/00; G06F 17/00; G06F 12/00; G06F 12/14
(52) U.S. Cl. .................... 707/8; 707/3; 707/1
(58) Field of Search ............................ 707/8, 3, 9, 100, 707/201, 1; 713/202

(56) References Cited

U.S. PATENT DOCUMENTS

| | | | | |
|---|---|---|---|---|
| 5,544,345 A | * | 8/1996 | Carpenter et al. | .......... 395/477 |
| 5,561,794 A | * | 10/1996 | Fortier | .................... 395/600 |
| 5,737,536 A | * | 4/1998 | Herrmann et al. | ..... 395/200.59 |
| 5,822,588 A | * | 10/1998 | Sterling et al. | ............. 395/704 |
| 5,890,161 A | * | 3/1999 | Helland et al. | ............. 707/103 |
| 6,023,706 A | * | 2/2000 | Schmuck et al. | ........... 707/200 |

OTHER PUBLICATIONS

Y. Edmund Lien et al., International Conference on Management of Data and Symposium on Principles of database Systems. Session: Consistency, Concurrency, and crash recovery. Publisher ACM Press New York, USA, p. 9–14, 1978.*

Gray et al., Modern Languages and Microsoft's Component Object Model. Communication of the ACM, May 1998/vol. 41. No. 5.*

* cited by examiner

*Primary Examiner*—Safet Metjahic
*Assistant Examiner*—Cindy Nguyen
(74) *Attorney, Agent, or Firm*—Christopher H. Lynt; Leslie J. Payne

(57) ABSTRACT

A one writer, multiple readers, shared data table concurrent access process includes providing a plurality of data elements. The data elements include a serialization mechanism. A second data element is a table/array of elements. A third data element is an atomic, integer counter. Inserting a new element into the shared unsorted data table by a writer includes locking the table. Removing an element at a position in the shared unsorted data table by a writer includes locking the table, copying the table so that the element to be removed is at the end of the table, deleting the element at the end of the table, and unlocking the table. From the shared data table by a reader includes looping through all elements of the table, loading and caching each element of the table, and read-only processing each element of the table.

20 Claims, 4 Drawing Sheets

301
(A) INSERT NEW ELEMENT INTO SHARED UNSORTED DATA TABLE BY WRITER
 (1) LOCK TABLE PREVENTING OTHER WRITERS FROM WRITING TO TABLE
 (2) PUT NEW ELEMENT AT END OF TABLE
 (3) INCREMENT COUNTER MAKING NEW ELEMENT VISIBLE TO ALL READERS
 (4) UNLOCK TABLE 302
(B) REMOVE ELEMENT IN SHARED UNSORTED DATA TABLE BY WRITER
 (1) LOCK TABLE PREVENTING OTHER WRITERS FROM WRITING TO TABLE
 (2) COPY TABLE SO THAT ELEMENT TO BE REMOVED IS AT END OF TABLE
 (3) DECREMENT COUNTER
 (4) UNLOCK TABLE 303
(C) READ FROM SHARED DATA TABLE BY READER
 (1) LOOP THROUGH ALL ELEMENTS OF TABLE
 (2) LOAD AND CACHE EACH ELEMENT OF TABLE
 (3) READ-ONLY PROCESS EACH ELEMENT OF TABLE

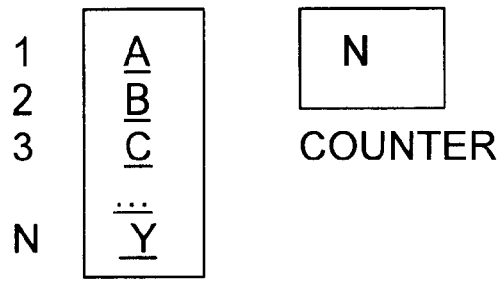
FIG. 1a - STATE 1
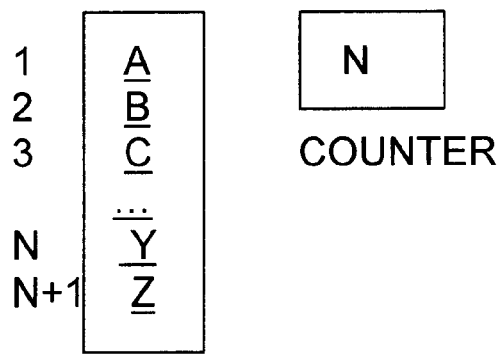
FIG. 1b - STATE 2
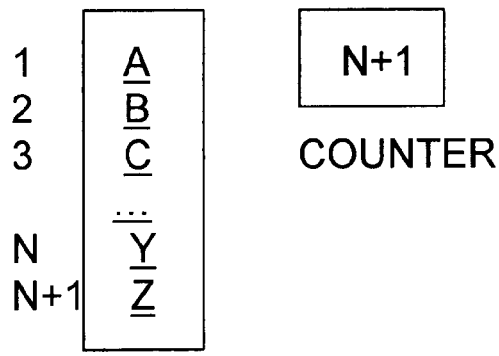
FIG. 1c - STATE 3

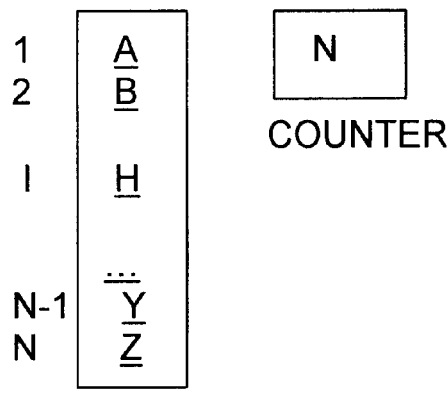
FIG. 2a - STATE 1
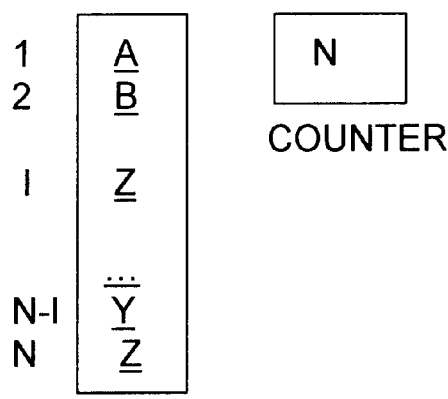
FIG. 2b - STATE 2
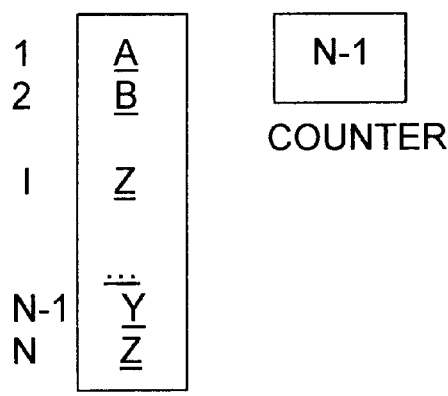
FIG. 2c - STATE 3

301

(A) INSERT NEW ELEMENT INTO SHARED UNSORTED DATA TABLE BY WRITER

(1) LOCK TABLE PREVENTING OTHER WRITERS FROM WRITING TO TABLE (2) PUT NEW ELEMENT AT END OF TABLE (3) INCREMENT COUNTER MAKING NEW ELEMENT VISIBLE TO ALL READERS (4) UNLOCK TABLE

302

(B) REMOVE ELEMENT IN SHARED UNSORTED DATA TABLE BY WRITER

(1) LOCK TABLE PREVENTING OTHER WRITERS FROM WRITING TO TABLE (2) COPY TABLE SO THAT ELEMENT TO BE REMOVED IS AT END OF TABLE (3) DECREMENT COUNTER (4) UNLOCK TABLE

303

( C) READ FROM SHARED DATA TABLE BY READER

(1) LOOP THROUGH ALL ELEMENTS OF TABLE (2) LOAD AND CACHE EACH ELEMENT OF TABLE (3) READ-ONLY PROCESS EACH ELEMENT OF TABLE

FIG. 3

ONE WRITER, MULTIPLE READERS, SHARED DATA TABLE CONCURRENT ACCESS

BACKGROUND OF THE INVENTION

1. Field of the Invention

The invention relates to the field of computer system data access protection.

2. Background Information

Collections of data called databases are well known. Computer systems which can be used by multiple users are also well known. Database programs provide fast and efficient access to records in a database. To properly handle the distribution and retrieval of the data, data processing systems often include database management programs. These programs provide easy access to database information.

One common configuration of a database is one that is made up of various tables with each table containing rows and columns of information. The information stored across one row in the table would make up one record and the fields of the record would be the columns in the table. In other words, the table would contain rows of individual records and columns of record fields. Because one record may contain more than one field of information, the information of the field would make up the columns of the database table. Other database configurations are found in the art.

Database management programs often must support multiple users and should enable each user to access the same table concurrently. However, when more than one user on a multi-user system attempts to access a database, problems may arise. If one user is reading from the database, while another user is writing to the database, the data integrity of the data read by the first user is suspect. If two users are attempting to write data to the database, what is actually written is unpredictable and so data integrity is suspect. To minimize these and other data integrity problems, locking schemes have been implemented, wherein only one user at a time was allowed to access the database.

Locking a database meant that, whenever a user was reading from or writing to the database, only that user was allowed to access that database, while all other users were locked out. Thus, the problem of one user writing data to a database while another prior user is reading the same data from the database was eliminated. The problem of two users simultaneously writing to a database was also eliminated.

However, locking created system bottlenecks which severely impacted overall system performance, even in a small system with a small number of users. A single user could monopolize a database by gaining access and holding it locked. Other users were forced to wait for access until that first single user released the lock on the database. After the first user released the lock, a second user was free to gain access to the database and monopolize it just as the first user had. That time spent idly waiting was unproductive, wasted and, therefore, impaired system performance. For a larger system with a large number of users attempting to access the same database, the effective result was the same regardless of whether a single user was monopolizing the database. That was because even if no single user attempted to monopolize a single database, the aggregate time spent by all of the users attempting to access the database meant that each user spent a significant amount of time idly waiting for a turn in accessing the database.

In order to address this locking problem and to improve multi-user system performance by reducing the amount of time each user spent waiting for the same database, locks were distinguished based on the type of user access to the database. Thus locks were distinguished as read locks or write locks. A user having a read lock merely prevented another user from writing to the database, while allowing other users to obtain read locks and, concurrently, to read from the same database. A user having a write lock excluded all access by other users until the user having the write lock released the write lock. A system having read locks and write locks to achieve concurrency is also known as "several readers and one writer" system.

The above-described practice of protecting shared data tables involves allowing either multiple concurrent readers of the data, or at most one writer with no readers. However, a problem with this practice is that changing the table (writing) can be expensive because it blocks readers during the updates. In a multi-processing environment with numerous CPUs (central processing units), modifying performance critical shared data tables can become a bottleneck adversely affecting system performance.

Therefore, data access could be made more efficient and the bottleneck problems in the prior art overcome by an improved data access method.

SUMMARY OF THE INVENTION

It is, therefore, a principal object of the invention to provide a method for a one writer, multiple readers, shared data table concurrent access.

It is another object of the invention to provide a method and apparatus that solves the above mentioned problems so that one writer and multiple readers, can share a data table through concurrent access.

These and other objects of the present invention are accomplished by the method and apparatus disclosed herein.

According to an aspect of the invention, at most one writer is allowed to be updating a shared data table while multiple readers are using the same table.

According to an aspect of the invention, there are three data elements used. The first of these is a serialization mechanism, e.g., a semaphore (in the case of an IBM AS/400, an "SLIC QuGate object"). This mechanism is used to ensure at most one writer is modifying the shared data. Readers do not use this serialization at all. The second of these is a table/array of elements. Each element of the table must be able to be updated atomically by a processor with a load or store instruction. The third of these is an atomic, integer counter that indicates how many shared data elements are contained in the table.

According to an aspect of the invention, inserting a new element into the shared unsorted data table by a writer includes locking the table, wherein other writers are prevented from writing to the table, putting the new element at the end of the table, incrementing the counter, thereby making the new element visible to all readers, and unlocking the table.

According to an aspect of the invention, removing an element at a position in the shared unsorted data table by a writer includes locking the table, copying the table so that the element to be removed is at the end of the table, decrementing the counter, and unlocking the table.

According to an aspect of the invention, reading from the shared data table by a reader includes looping through all elements of the table, loading and caching each element of the table, and read-only processing each element of the table.

These and other aspects of the invention will become apparent from the detailed description set forth below.

BRIEF DESCRIPTION OF THE DRAWINGS

FIGS. 1a, 1b and 1c illustrate three state diagrams for adding a new element "Z" to a table that already contains "N" elements according to an exemplary embodiment of the present invention.

FIGS. 2a, 2b and 2c illustrate three state diagrams for removing an element "H" located at position "I" in the table containing "N" elements according to an exemplary embodiment of the invention.

FIG. 3 illustrates a flow chart according to an exemplary embodiment of the invention.

DETAILED DESCRIPTION OF THE PREFERRED EMBODIMENT(S)

Figure 4:
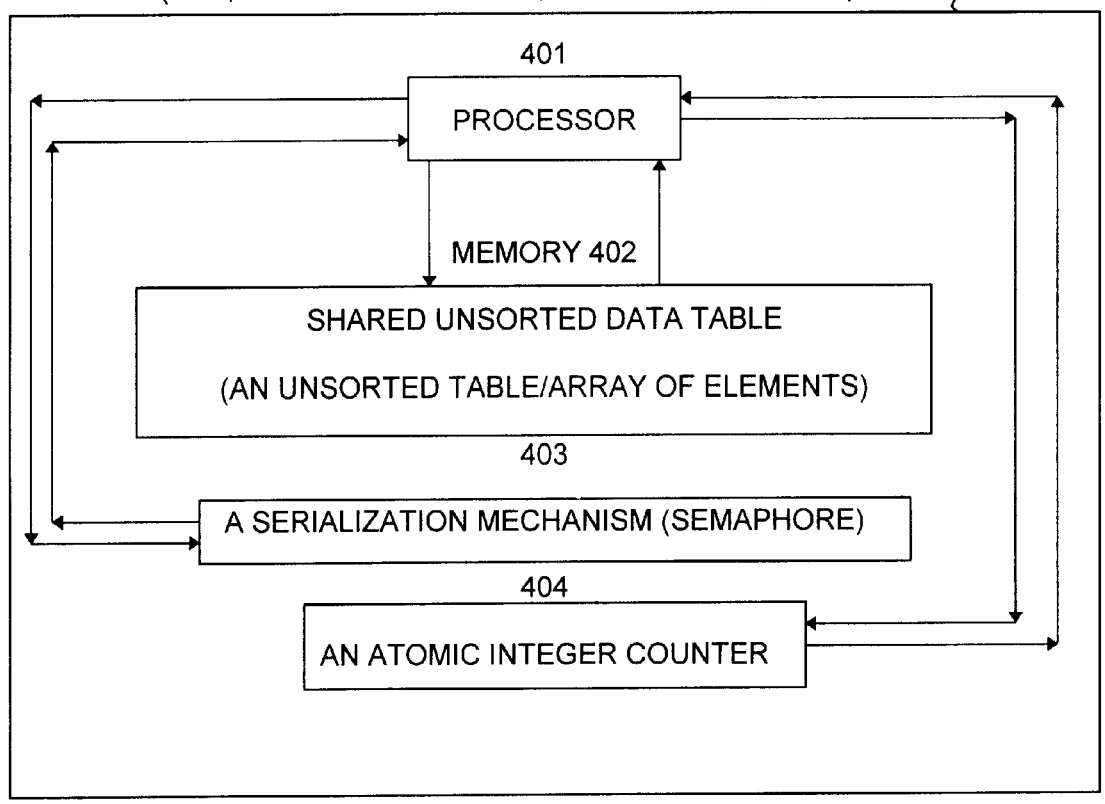
FIG. 4 illustrates a system according to an exemplary embodiment of the invention.

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

There are three important data elements for the design:

(1) A serialization mechanism (403), e.g., a semaphore (in the case of an IBM AS/400, an "SLIC QuGate object"). This mechanism is used to ensure at most one writer is modifying the shared data. Readers do not use this serialization at all.

(2) A table/array of elements (shown in memory 402). Each element of the table must be able to be updated atomically by a processor (e.g., on the AS/400 an 8-byte pointer or 64-bit integer on an 8-byte boundary) with a load or store instruction.

(3) An atomic, integer counter (404) that indicates how many shared data elements are contained in the table.

FIGS. 1a, 1b and 1c illustrate three state diagrams for adding a new element "Z" to a table that already contains "N" elements according to an exemplary embodiment of the present invention. In FIG. 1a, the state of the counter and the data table are shown before the operation has begun. It is assumed that the data table has additional entries beyond the end to accommodate the new entry. In FIG. 1b, the state of the table and counter are shown after element "Z" has been appended to the end of the table. In FIG. 1c, the state of the counter (incremented) and the data table are shown atomically updated with the new table size. Element "Z" is now visible to all readers. This is what the data looks like after the operation completes. During the update process, all concurrent readers will only see the above three states, due to atomicity requirements.

FIGS. 2a, 2b and 2c illustrate three state diagrams for removing an element "H" located at position "I" in the table containing "N" elements according to an exemplary embodiment of the invention. In FIG. 2a, the state of the counter and the data table are shown before the operation has begun. In FIG. 2b, the last element "Z" is copied into location "I" that was occupied by element "H". Element "Z" is now a duplicate. In FIG. 2c, the state of the counter (decremented) and the data table is shown after the operation has completed. The second copy of "Z" is removed from the visibility of readers by decrementing the counter. During the update process, all concurrent readers will only see the above three states, due to the atomicity requirements.

For the following algorithms, assume these variables are:

GATE Writer serialization mechanism, allowing at most one holder of the lock

N Number of elements currently in the shared data table

TABLE An array of elements, index is 0-based

The following is an exemplary algorithm for inserting a new element (ELEMENT) into the shared data table:

GATE.lock( ) //prevent other writers
TABLE[N]=ELEMENT //put the new element at the end
N=N+1//make the element visible to all readers
GATE.unlock( ) //release writer lock The following is an exemplary algorithm for removing an element at a position (I) in the table:

GATE.lock( ) //prevent other writers
TABLE[I]=TABLE[N−1]//duplicate last element into removal position
N=N−1//delete duplicate now at the end
GATE.unlock( ) //release writer lock The following is an exemplary algorithm for a reader of the table (no locking), who needs to process every element:

for I=0 to N−1//loop thru all elements in table
ELEMENT=TABLE[I]//atomically load and cache an element
process(ELEMENT) //do read-only processing with the element end for The above exemplary algorithms show insertion and removal from an unsorted table where order does not matter. If an ordered, sorted table is required by an application, then the above algorithms can be easily extended, as would be readily apparent to one skilled in the art. Such modifications are not listed here because they are not necessary for a complete understanding of the invention.

The order of statements executed in the above algorithms is important, and must occur in the sequence listed so as to be visible to all processors on the system before a subsequent statement is executed.

There are some very important assumptions that must be true before the algorithms should be used by an application:

(1) Updates to the table are less frequent than readers.

(2) Processing of elements already in the table is not 100% required. Because of the way the algorithms work, there is not an absolute guarantee that an element stored in the table will be visible to a reader during an update.

(3) The application can tolerate having the same element appear more than once in the table for a reader during an update. The removal algorithm hinges on being able to duplicate valid entries in the table before removal actually occurs.

(4) The requirements above for having an atomic counter and table elements is necessary for eliminating the possibility of reading a variable and getting corrupted values (e.g., half old, half new).

(5) After removing an element from the table, it is possible that readers active during the removal could still be processing the element, The application must therefore not invalidate the removed element immediately after unlocking the writer's gate.

As long as the application can tolerate these five conditions, the exemplary algorithms according to the invention can improve system performance and break performance bottlenecks.

FIG. 3 illustrates a flow chart of process flow according to an exemplary embodiment of the invention. In block 301, the process flow for inserting a new element into a shared unsorted data table by a writer is illustrated. This process includes four steps: (1) lock the table preventing other writers from writing to the table; (2) put a new element at the end of the table; (3) increment the counter making the new element visible to all readers; and (4) unlock the table.

In block 302, the process flow for the removal of an element in a shared unsorted data table is illustrated. This process includes four steps: (1) lock the table preventing other writers from writing to the table; (2) copy the table so that the element to be removed is at the end of the table; (3) decrement the counter; and (4) unlock the table.

In block 303, the process flow for reading from a shared data table is illustrated. This process includes three steps: (1) loop through all the elements of the table; (2) load and cache each element of the table; and (3) read-only process each element of the table.

FIG. 4 illustrates a system 400, having a processor 401, memory 402, a serialization mechanism 403 and an atomic integer counter 404, according to an exemplary embodiment of the invention. The invention involves algorithms and assumptions that allow at most one writer to be updating a shared data table while multiple readers are using the same table.

The solution according to the invention differs from others in that reading shared data does not stop when doing updates to the shared data. A performance penalty for readers is not incurred by needing to execute the seize and release code to obtain a shared lock, reducing the instruction path length for "hot" paths in the system. Also, some forms of locking in operating systems require an application's data to be resident in main storage so as not to cause page faults during the time that the lock is being held. By eliminating the shared reader lock, the faultless requirement has been eliminated (in some cases), which further reduces path length and working set size of an application.

The invention has applicability in, for example, the IBM Gigabit Ethernet Adapter (2743) on the IBM AS/400. The device driver in the OS/400 operating system uses the algorithm according to the invention for mapping incoming network packets to clients interested in receiving particular kinds of packets. The device driver thus enables a client to be added/removed from this table without disrupting the incoming flow of packets needing to be routed. Performance is important to this adapter, and hence the application of this invention is an advantage for the card.

Because no locking for readers of the table is necessary, the present invention also removes requirements for pinning storage and obtaining/releasing spin locks, all of which would hurt the code path lengths for servicing the network packets. This particular application of the algorithm meets all assumptions listed above, because the device driver has the luxury of "dropping" incoming network packets at its discretion.

The invention also has applicability other adapters, such as adapters for providing multiple connections to the same logical direct access storage device (DASD—disk drive). The DASD router would use the algorithm according to the invention to enable the different connection paths to be added/removed to the router's table without disrupting the flow of DASD commands with the system. Similar to the Gigabit Ethernet Adapter implementation mentioned above, there will be no requirements for locking, so routing can be done efficiently from an interrupt handler.

The invention may be embodied as a computer program product. A computer program product includes a recording medium, such as a floppy disk, a high-capacity read only memory in the form of an optically read compact disc or CD-ROM, a tape, a transmission type media, such as a digital or analog communications link, or a similar computer program product.

It will be apparent to one skilled in the art that the manner of making and using the claimed invention has been adequately disclosed in the above-written description of the preferred embodiment(s) taken together with the drawings.

It will be understood that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. A method for a one writer, multiple readers, shared unsorted data table concurrent access, comprising:
   providing a plurality of data elements, including:
   a serialization mechanism, wherein at most one writer is able to modify shared data, and readers do not use this serialization at all;
   a table/array of elements, wherein each element of the table must be able to be updated atomically by a processor with a load or store instruction; and
   an atomic, integer counter that indicates how many shared data elements are contained in the table;
   inserting a new element into the shared unsorted data table by a writer including:
   (1) locking the table, wherein other writers are prevented from writing to the table;
   (2) putting the new element at the end of the table;
   (3) incrementing the counter, thereby making the new element visible to all readers; and
   (4) unlocking the table.

2. The method according to claim 1, further comprising:
   reading from the shared data table by a reader including:
   (1) looping through all elements of the table;
   (2) loading and caching each element of the table; and
   (3) read-only processing each element of the table.

3. The method according to claim 1, further comprising:
   removing an element at a position in the shared unsorted data table by a writer including:
   (1) locking the table, wherein other writers are prevented from writing to the table;
   (2) copying the table so that the element to be removed is at the end of the table;
   (3) decrement the counter; and
   (4) unlocking the table.

4. The method according to claim 1, wherein the serialization mechanism comprises a semaphore.

5. A method for a one writer, multiple readers, shared unsorted data table concurrent access, comprising:
   providing a plurality of data elements, including:
   a serialization mechanism, wherein at most one writer is able to modify shared data, and readers do not use this serialization at all;

an unsorted table/array of elements, wherein each element of the table must be able to be updated atomically by a processor with a load or store instruction; and an atomic, integer counter that indicates how many shared data elements are contained in the table;

removing an element at a position in the shared unsorted data table by a writer including:
(1) locking the table, wherein other writers are prevented from writing to the table;
(2) copying the table so that the element to be removed is at the end of the table;
(3) decrementing the counter; and
(4) unlocking the table.

6. The method according to claim 5, further comprising:
reading from the shared data table by a reader including:
(1) looping through all elements of the table;
(2) loading and caching each element of the table; and
(3) read-only processing each element of the table.

7. The method according to claim 5, wherein the serialization mechanism comprises a semaphore.

8. The method according to claim 5, wherein the shared data table comprises a network packet mapping table in a network adapter device.

9. The method according to claim 5, wherein the shared data table comprises a connection path table in a direct access storage device router.

10. A method for a one writer, multiple readers, shared unsorted data table concurrent access, comprising:
providing a plurality of data elements, including:
a serialization mechanism, wherein at most one writer is able to modify shared data, and readers do not use this serialization at all;
an unsorted table/array of elements, wherein each element of the table must be able to be updated atomically by a processor with a load or store instruction; and
an atomic, integer counter that indicates how many shared data elements are contained in the table;
reading from the shared data table by a reader including:
(1) looping through all elements of the table;
(2) loading and caching each element of the table; and
(3) read-only processing each element of the table.

11. The method according to claim 10, wherein the serialization mechanism comprises a semaphore.

12. The method according to claim 1, wherein the shared data table comprises of one:
a network packet mapping table in a network adapter device; and
a connection path table in a direct access storage device router.

13. The method according to claim 10, wherein, wherein the shared data table comprises a network packet mapping table in a network adapter device.

14. The method according to claim 10, wherein the shared data table comprises a connection path table in a direct access storage device router.

15. A data processing system having memory for storing data and processing means for processing the stored data, the system providing concurrent shared access by a plurality of users to a shared unsorted data table stored in memory, wherein the system provides a plurality of data elements, including:
a serialization mechanism, wherein at most one writer is able to modify shared data, and readers do not use this serialization at all;
an unsorted table/array of elements, wherein each element of the table must be able to be updated atomically by a processor with a load or store instruction; and
an atomic, integer counter that indicates how many shared data elements are contained in the table.

16. The system according to claim 15, wherein a data table access method is implemented so that:
(A) inserting a new element into the shared unsorted data table by a writer includes:
(1) locking the table, wherein other writers are prevented from writing to the table;
(2) putting the new element at the end of the table;
(3) incrementing the counter thereby making the new element visible to all readers; and
(4) unlocking the table;
(B) removing an element at a position in the shared unsorted data table by a writer includes:
(1) locking the table, wherein other writers are prevented from writing to the table;
(2) copying the table so that the element to be removed is at the end of the table;
(3) decrementing the counter; and
(4) unlocking the table; and
(C) reading from the shared data table by a reader includes:
(1) looping through all elements of the table;
(2) loading and caching each element of the table; and
(3) read-only processing each element of the table.

17. A computer program product including a recording medium, the recording medium having program instructions stored thereon for implementing the method according to claim 1.

18. A computer program product including a recording medium, the recording medium having program instructions stored thereon for implementing the method according to claim 5.

19. A computer program product including a recording medium, the recording medium having program instructions stored thereon for implementing the method according to claim 10.

20. A method for a one writer, multiple readers, shared unsorted data table concurrent access, comprising:
providing a plurality of data elements, including:
a serialization mechanism, wherein at most one writer is able to modify shared data, and readers do not use this serialization at all;
a table/array of elements, wherein each element of the table must be able to be updated atomically by a processor with a load or store instruction; and
an atomic, integer counter that indicates how many shared data elements are contained in the table;
(A) inserting a new element into the shared unsorted data table by a writer including:
(1) locking the table, wherein other writers are prevented from writing to the table;
(2) putting the new element at the end of the table;
(3) incrementing the counter thereby making the new element visible to all readers; and
(4) unlocking the table;
(B) removing an element at a position in the shared unsorted data table by a writer including:
(1) locking the table, wherein other writers are prevented from writing to the table;
(2) copying the table so that the element to be removed is at the end of the table;
(3) decrementing the counter; and (4) unlocking the table; and
(C) reading from the shared data table by a reader including:
(1) looping through all elements of the table;
(2) loading and caching each element of the table; and
(3) read-only processing each element of the table.

* * * * *